United States Patent Office.

LEOPOLD BRANDEIS, OF BROOKLYN, NEW YORK.

Letters Patent No. 113,973, dated April 25, 1871.

---

IMPROVEMENT IN MATERIALS FOR FILTERING.

---

The Schedule referred to in these Letters Patent and making part of the same.

---

I, LEOPOLD BRANDEIS, of Brooklyn, county of Kings and State of New York, have invented a new and useful Preparation for Filtering and Purifying Liquids and Solutions and for deodorizing and clarifying the same.

The nature of my invention consists in carbonizing matter containing the elements of animals and vegetables in combination.

To prepare this filtering medium the article called sponge is perfectly cleaned, freed from sand, &c., and dried. A given quantity of the material so prepared is inclosed in an air-tight cylinder or vessel of any kind, shape, or material sufficiently strong to resist the temperature needed for carbonization of its contents, say a muffle. A slight red heat applied for this purpose is sufficient; but the material carbonized must be permitted to cool in the vessel, as the admission of cold air would produce ashes and destroy the cohesion.

I also prepare this filtering medium by sinking the vessel inclosing it in boiling lead, to get an even temperature all around the circumference.

I do not claim sponge, as such, for filtering purposes, as this has been done for a great many years.

What I claim as my invention, and desire to secure by Letters Patent, is—

The production of a catalytic filtering medium by carbonizing sponge either by direct heat or by immersion in hot metal or other suitable material.

LEOPOLD BRANDEIS.

Witnesses:
GEORGE INCH,
WM. WARING, Jr.